May 21, 1940.  A. BOKEMÜLLER  2,201,221
INTERNAL COMBUSTION ENGINE RECEIVING FUEL BY INJECTION
Filed March 30, 1935
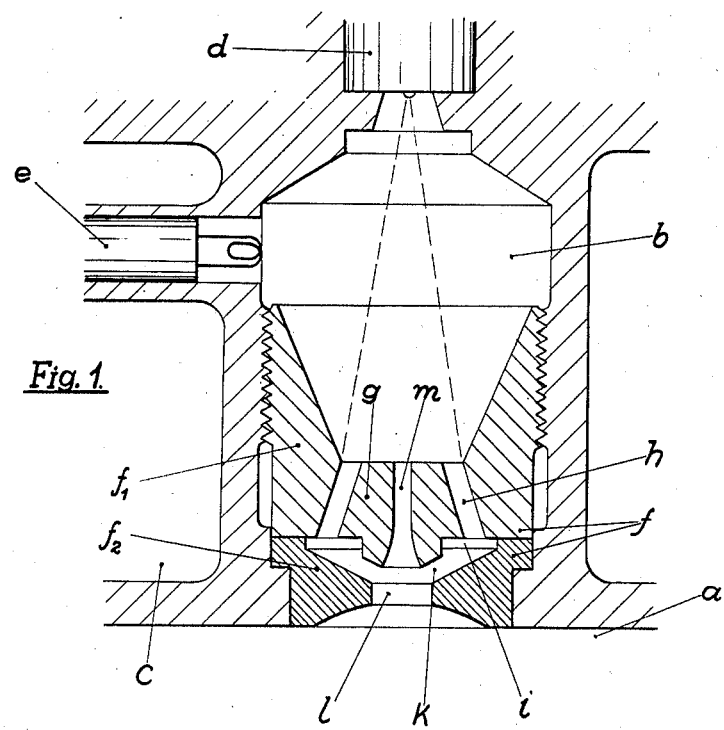
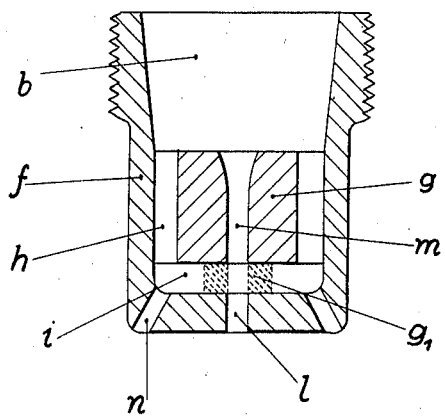
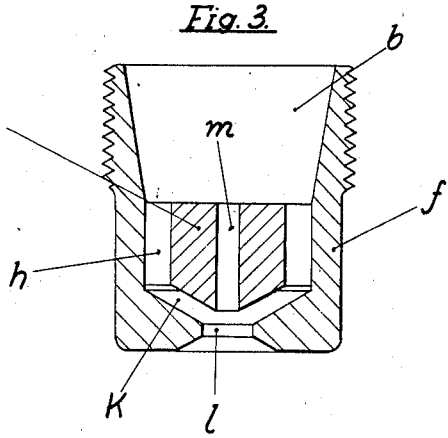
Inventor.
Alfred Bokemüller Patented May 21, 1940

2,201,221

UNITED STATES PATENT OFFICE 2,201,221

INTERNAL COMBUSTION ENGINE RECEIVING FUEL BY INJECTION

Alfred Bokemüller, Gaggenau, Germany, assignor to Daimler-Benz Aktiengesellschaft, Stuttgart-Unterturkheim, Germany Application March 30, 1935, Serial No. 13,965
In Germany April 4, 1934

2 Claims. (Cl. 123—33)

This invention relates to internal combustion engines of the kind in which the fuel is injected, more particularly Diesel engines provided with a precombustion chamber, that is to say having a main combustion chamber which communicates with another combustion chamber through openings in such a manner that the fuel which is injected into the one combustion chamber, more particularly a precombustion chamber, can only pass these openings out of this combustion chamber into the other combustion chamber, more particularly the main combustion chamber, after receiving a change in direction, a straight line exit of the fuel through these openings being prevented.

The invention consists substantially in this that an additional, more particularly central opening is provided between the two combustion chambers which establishes straight line communication between the two combustion chambers and/or through which a portion of the fuel is injected right through in a straight line stream from the nozzle.

The invention consists further in the employment of a core piece which is arranged in the direction of the stream of fuel passing out of the precombustion chamber in front of the main combustion chamber and over which the fuel can pass with a change in direction to be transferred to the main combustion chamber, a central aperture being provided in the core piece for placing the precombustion chamber into direct communication with the main combustion chamber.

The invention has the advantage that an extensive atomisation and intermixture of the fuel and at the same time easy starting of the engine can be attained even from the cold state in that on the one hand a passage through of the fuel into the main combustion chamber through a part, more particularly the plurality of passages is only possible after repeated deflection and repeated collisions, acceleration and retardation and on the other hand in that a portion of the fuel passes directly into the main combustion chamber and can be ignited there.

Preferably the current of fuel divided up into separate streams is united again beyond the core piece before it is transferred into the main combustion chamber, whereby a particularly good and thorough admixture of the air and fuel is produced. This action is further increased if in front of the throttle opening leading to the main combustion chamber a conical annular passage is provided into which the central through aperture of the core piece delivers. The fuel passing out of this aperture is impinged upon by the mixture stream in an inclined direction from the rear and is atomised in the main combustion chamber in a particularly effective manner.

The central through aperture of the core piece has the further advantage that during the compression stroke the current of air passing into the precombustion chamber through the aperture hits the stream of fuel in its core and produces an effective intermixture. At the same time the fuel is driven outwardly against the walls of the insertion or against an incandescent spiral arranged laterally in the precombustion chamber, which spiral as well as the walls are thus protected from being cooled down strongly by means of the current of air.

The atomising action of the jet of air can be still further increased by narrowing the central aperture towards the precombustion chamber, e. g. in the manner of a nozzle. Such an aperture at the same time produces a stronger throttling action upon a current of air passing out of the main combustion chamber into the precombustion chamber than on a current of air passing in the reverse direction so that a higher outflow pressure of the precombustion chamber is obtained.

On the other hand if it is required that the greatest possible portion of the fuel flow directly into the main combustion chamber, this requirement holding good mainly during the power stroke, then it may be desirable to widen the central conduit towards the precombustion chamber so that it receives the fuel in the manner of a funnel.

The invention is illustrated by way of example in three constructional forms in the accompanying drawing.

In Fig. 1 $a$ is the main combustion chamber, $b$ the precombustion chamber, $c$ the cooling water jacket, $d$ the injection nozzle, $e$ the spark plug, $f$ an insertion comprising for instance the two parts $f_1$ and $f_2$, the upper part $f_1$ having an inner core piece $g$ connected to it by means of bridging members and against which is directed the fuel jet indicated by dotted lines.

The core piece $g$ is surrounded by a plurality of bored apertures $h$ (e. g. 4 to 8) which are arranged to extend more or less in the direction of the jet of fuel and which deliver into an annular channel $i$. The latter merges into a conical narrowing annular channel $k$ which in turn communicates through a central opening $l$ with the main combustion chamber. In accordance with the invention the core g is bored through centrally from the top to the bottom so that the fuel can be injected directly through the conduit m and through the opening l into the main combustion chamber. The bored aperture m is in this case widened towards the main combustion chamber or narrowed towards the precombustion chamber.

In Fig. 2 the conduits h are vertically directed and deliver into a disc-shaped chamber i which, in addition to the central opening, communicates with the main combustion chamber through additional openings n. The central through-going aperture m of the core is further widened towards the precombustion chamber. Optionally the core piece g, as indicated at $g_1$, may be connected to the insertion f in such a manner that the conduits m and l form a single unitary conduit and have no communication with the annular space i.

In Fig. 3, a similar construction to that shown in Fig. 1 is illustrated, only in this case the conduits h are parallel to the axis of the precombustion chamber. The central conduit m is provided with a uniform cross-section.

The number of modifications could of course be increased at will.

What I claim is:

1. In an internal combustion engine receiving fuel by injection, in combination, a main combustion chamber, a precombustion chamber having a throttling opening therein for establishing communication between the interior of the precombustion chamber and the main combustion chamber, a core piece arranged in the precombustion chamber on the side of said throttling opening remote from the main combustion chamber and having a restricted straight throttling bore therein for establishing communication between the precombustion chamber and said opening, a plurality of throttling conduits grouped around said core piece for establishing further communication between the precombustion chamber and said throttling opening and a fuel injection nozzle arranged to inject a jet of fuel through the precombustion chamber directly into said throttling bore and throttling conduits with the axis of the jet substantially in alignment with the axis of the throttling bore so as to allow fuel from the nozzle to pass in a straight line through the precombustion chamber, through said throttling bore and said throttling opening into the main combustion chamber, said throttling conduits having a bend therein so that the fuel injected into them can pass only through said throttling opening into the main combustion chamber after being subjected to a change in its direction of flow.

2. In an internal combustion engine receiving fuel by injection, in combination, a main combustion chamber, a precombustion chamber having a throttling opening therein for establishing communication between the precombustion chamber and the main combustion chamber and a conical annular passage on the side of said throttling opening remote from the main combustion chamber with its apex located adjacent said throttling opening, a core piece arranged in the precombustion chamber on the side of said conical annular passage remote from said throttling opening and having a narrow straight central throttling bore therein for establishing communication between the precombustion chamber and the conical annular passage, a plurality of throttling conduits grouped around said throttling bore for establishing further communication between the precombustion chamber and the conical annular passage and a fuel injection nozzle arranged to inject a jet of fuel through the precombustion chamber directly into said throttling bore and throttling conduits with the axis of the jet substantially in alignment with the axis of the throttling bore so as to allow fuel from the nozzle to pass in a straight line through the precombustion chamber, through said throttling bore and said throttling opening into the main combustion chamber, said throttling conduits converging toward the jet of fuel in the direction of the fuel injection nozzle and co-operating with the conical annular passage to produce a change in the direction of flow of the fuel injected into the throttling conduits and direct the said fuel in an inclined direction towards the fuel emerging from the throttling bore prior to entering said throttling opening.

ALFRED BOKEMÜLLER.